(12) United States Patent
Wang et al.

(10) Patent No.: US 11,360,351 B2
(45) Date of Patent: Jun. 14, 2022

(54) BACKLIGHT MODULE, DISPLAY SCREEN AND TILED DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xinrui Wang, Beijing (CN); Haijun Shi, Beijing (CN); Hao Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/209,679

(22) Filed: Mar. 23, 2021

(65) Prior Publication Data
US 2021/0302788 A1 Sep. 30, 2021

(30) Foreign Application Priority Data
Mar. 26, 2020 (CN) ............................ 02010225310.9

(51) Int. Cl.
*G02F 1/13357* (2006.01)
*G02F 1/1333* (2006.01)
*G06F 3/14* (2006.01)

(52) U.S. Cl.
CPC .... *G02F 1/133608* (2013.01); *G02F 1/13336* (2013.01); *G02F 1/133603* (2013.01); *G06F 3/1446* (2013.01)

(58) Field of Classification Search
CPC ........... G02F 1/133608; G02F 1/13336; G02F 1/133603; G06F 3/1446
See application file for complete search history.

(56) References Cited

U.S. PATENT DOCUMENTS

| 2005/0212991 | A1 | 9/2005 | Sugawara | |
|---|---|---|---|---|
| 2008/0192168 | A1* | 8/2008 | Sudo | G02F 1/133308 349/58 |
| 2008/0252808 | A1* | 10/2008 | Chang | G02F 1/133608 349/58 |
| 2009/0257181 | A1* | 10/2009 | Ha | H01L 51/5237 361/679.26 |

(Continued)

FOREIGN PATENT DOCUMENTS

| CN | 203164556 | 8/2013 |
|---|---|---|
| CN | 103823321 | 5/2014 |

(Continued)

OTHER PUBLICATIONS

English Translation of Kai JP-2008-102280, published 2008 (Year: 2008).*

(Continued)

*Primary Examiner* — Evan P Dzierzynski
(74) *Attorney, Agent, or Firm* — Dority & Manning, P.A.

(57) ABSTRACT

A backlight module includes a back plate and a middle frame assembly disposed on the back plate. The middle frame assembly includes a first frame body and a second frame body. The first frame body is sleeved outside of the second frame body, and the first frame body and the second frame body have a deformation space therebetween.

19 Claims, 15 Drawing Sheets

A-A'

(56) References Cited

U.S. PATENT DOCUMENTS

| | | | | |
|---|---|---|---|---|
| 2016/0011461 A1* | 1/2016 | Kim | ................ | G02F 1/133608 |
| | | | | 349/64 |
| 2016/0109907 A1* | 4/2016 | Cao | .................. | G06F 1/1626 |
| | | | | 345/175 |
| 2017/0261802 A1* | 9/2017 | Li | .................. | G02F 1/133608 |

FOREIGN PATENT DOCUMENTS

| | | |
|---|---|---|
| CN | 103953874 | 7/2014 |
| CN | 204855990 | 12/2015 |
| CN | 106950751 | 7/2017 |
| CN | 109164519 | 1/2019 |
| JP | 2008102280 | 5/2008 |
| KR | 20070069706 | 7/2007 |

OTHER PUBLICATIONS

Chinese First Office Action (w/ English tranlation) for corresponding CN Application No. 202010225310.9, 19 pages.

* cited by examiner

BACKLIGHT MODULE, DISPLAY SCREEN AND TILED DISPLAY DEVICE

CROSS-REFERENCE TO RELATED APPLICATION

This application claims priority to Chinese Patent Application No. 202010225310.9, filed on Mar. 26, 2020, which is incorporated herein by reference in its entirety.

TECHNICAL FIELD

The present disclosure relates to the field of display technologies, and in particular, to a backlight module, a display screen and a tiled display device.

BACKGROUND

A tiled display device is a displayer with a large size formed by a plurality of display screens connected to each other. Each display screen may display images as an independent unit, or the plurality of display screens may collectively display a large image. Since the tiled display device has various display effects, it may be widely applied to different places such as airports, stations, conference halls, shopping malls, command centers and the like.

Generally, each display screen has a non-display region provided with circuits and/or peripheral traces therein, and thus one or more splicing gaps (also referred to as splicing regions) that cannot display images may exist in the tiled display device. In order to achieve a good display effect, a width of a splicing gap (i.e., a dimension of the splicing gap in a direction perpendicular to its own extending direction) should be as small as possible.

SUMMARY

In one aspect, embodiments of the present disclosure provide a backlight module. The backlight module includes a back plate and a middle frame assembly disposed on the back plate. The middle frame assembly includes a first frame body and a second frame body. The first frame body is sleeved outside of the second frame body, and the first frame body and the second frame body have a deformation space therebetween.

In some embodiments, the first frame body includes a plurality of first side walls connected in sequence. The second frame body includes a plurality of second side walls connected in sequence, and each second side wall is opposite to a respective one of the plurality of first side walls. At least one first side wall and a second side wall opposite thereto have at least a portion of the deformation space therebetween.

In some embodiments, each first side wall and a second side wall opposite thereto have a respective portion of the deformation space therebetween.

In some embodiments, end faces of the plurality of first side walls facing away from the back plate are connected in sequence to form a first frame opening, and end faces of the plurality of first side walls facing the back plate are connected in sequence to form a second frame opening. End faces of the plurality of second side walls facing away from the back plate are connected in sequence to form a third frame opening, and end faces of the plurality of second side walls facing the back plate are connected in sequence to form a fourth frame opening. A distance between the first frame opening and the second frame opening is greater than a distance between the third frame opening and the second frame opening. The backlight module further includes an optical film disposed at the third frame opening, a thickness of the optical film is less than or equal to a distance between the first frame opening and the third frame opening.

In some embodiments, a portion of the at least one first side wall proximate to the first frame opening is in contact with a portion of the second side wall proximate to the third frame opening. A gap between a remaining portion of the at least one first side wall and a remaining portion of the second side wall forms the at least a portion of the deformation space.

In some embodiments, the second side wall includes a first sub-side wall, a second sub-side wall and a third sub-side wall that are connected in sequence in a direction from the third frame opening to the fourth frame opening. The first sub-side wall is in contact with the at least one first side wall, the second sub-side wall is inclined facing away from the at least one first side wall relative to the first sub-side wall, the third sub-side wall is inclined towards the at least one first side wall relative to the second sub-side wall, and the gap between the remaining portion of the at least one first side wall and the remaining portion of the second side wall includes a gap between the second sub-side wall and a first side wall and a gap between the third sub-side wall and the first side wall.

In some embodiments, a portion of at least one first side wall proximate to the second frame opening is inclined towards a second side wall opposite to the at least one first side wall.

In some embodiments, the at least one first side wall includes two adjacent first side walls.

In some embodiments, the first frame body further includes a first flanging edge connected to the second frame opening, and/or the second frame body further includes a second flanging edge connected to the fourth frame opening.

In some embodiments, both the second flanging edge and the first flanging edge are fixedly connected to the back plate.

In some embodiments, the first frame body and the second frame body are each made of cold-rolled carbon steel.

In another aspect, embodiments of the present disclosure provide a display screen. The display screen includes the backlight module according to any of the above embodiments and a display panel disposed above the first frame body.

In some embodiments, the first frame body includes a plurality of first side walls connected in sequence, and a portion of each first side wall away from the back plate is exposed by the second frame body. The display panel has a display region and a non-display region outside of the display region. The non-display region is disposed above end faces of the plurality of first side walls facing away from the back plate, and a distance between a border of the non-display region and a border of the display region is greater than or equal to a thickness of a portion of each first side wall connected to the non-display region.

In some embodiments, the distance between the border of the non-display region and the border of the display region is approximately 0.5 mm, and the thickness of the portion of the first side wall connected to the non-display region is approximately 0.4 mm.

In some embodiments, the display screen further includes a first adhesive layer between the display panel and the first frame body.

In some embodiments, the first adhesive layer is made of optical adhesive.

In some embodiments, the backlight module further includes an optical film disposed above the second frame body. The display screen further includes a second adhesive layer located between the optical film and a surface of the second frame body facing away from the back plate.

In some embodiments, the first frame body includes a plurality of first side walls connected in sequence, a portion of each first side wall away from the back plate is exposed by the second frame body. The optical film has a plurality of side edges, each side edge faces a portion of a corresponding first side wall exposed by the second frame body. The second adhesive layer is further located between at least one side edge of the optical film and a first side wall opposite to the at least one side edge.

In some embodiments, the second adhesive layer is a transparent double-sided tape.

In yet another aspect, embodiments of the present disclosure provide a tiled display device including a plurality of display screens that are connected to each other, each according to any of the above embodiments.

BRIEF DESCRIPTION OF THE DRAWINGS

In order to describe technical solutions in the present disclosure more clearly, accompanying drawings to be used in some embodiments of the present disclosure will be briefly introduced. However, the accompanying drawings to be described below are merely accompanying drawings of some embodiments of the present disclosure, and a person of ordinary skill in the art may obtain other drawings according to these drawings. In addition, accompanying drawings in the following description may be regarded as schematic diagrams, and are not limitations on an actual size of a product, an actual process of a method and an actual timing of a signal to which the embodiments of the present disclosure relate.

DETAILED DESCRIPTION

Figure 1:
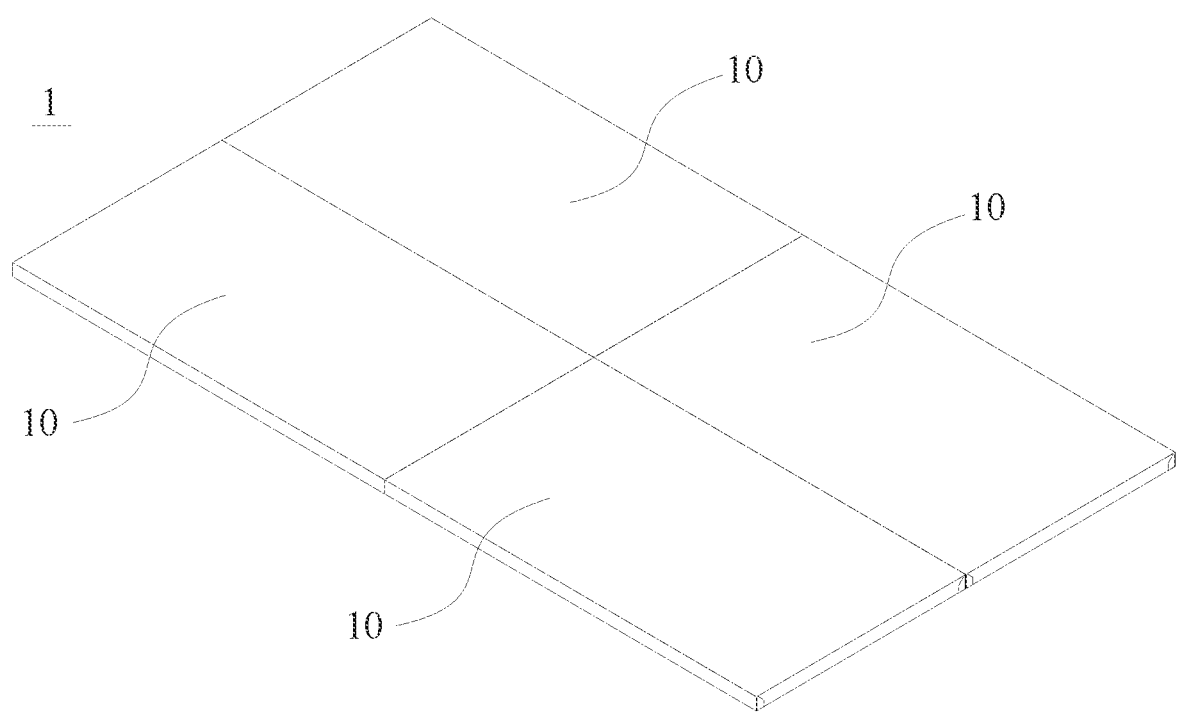
FIG. 1 is a structural diagram of a tiled display device in accordance with some embodiments.

Technical solutions in some embodiments of the present disclosure will be described clearly and completely with reference to the accompanying drawings. However, the described embodiments are merely some but not all of embodiments of the present disclosure. All other embodiments obtained based on the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as an open and inclusive meaning, i.e., "including, but not limited to". In the description of the specification, the terms "one embodiment", "some embodiments", "exemplary embodiments", "an example" or "some examples" and the like are intended to indicate that specific features, structures, materials, or characteristics related to the embodiment or example are included in at least one embodiment or example of the present disclosure. Schematic representations of the above terms do not necessarily refer to the same embodiment(s) or example(s). In addition, the specific features, structures, materials or characteristics may be included in any one or more embodiments/examples in any suitable manner.

Terms such as "first" and "second" are only used for descriptive purposes, and are not to be construed as indicating or implying the relative importance or implicitly indicating the number of indicated technical features below. Thus, features defined by "first" and "second" may explicitly or implicitly include one or more of the features. As used in this specification and the appended claims, the singular forms "a/an" and "the" may also include plural referents unless the content clearly dictates otherwise. In the description of the embodiments of the present disclosure, "a plurality of/the plurality of" means two or more unless otherwise specified.

In the description of some embodiments, terms such as "coupled" and "connected" and their extensions may be used. For example, term "connected" may be used in the description of some embodiments to indicate that two or more components are in direct physical or electrical contact with each other. As another example, term "coupled" may be used in the description of some embodiments to indicate that two or more components are in direct physical or electrical contact. However, term "coupled" or "communicatively coupled" may also mean that two or more components are not in direct contact with each other, but still cooperate or interact with each other. The embodiments disclosed herein are not necessarily limited to the content herein.

The expression "at least one of A, B and C" has a same meaning as the expression "at least one of A, B or C", and both include the following combinations of A, B and C: only A, only B, only C, a combination of A and B, a combination of A and C, a combination of B and C, and a combination of A, B and C. Similarly, the phrase "A and/or B" includes the following three combinations: only A, only B, and a combination of A and B.

The use of the phrase "applicable to" or "configured to" means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values other than those stated.

The term "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and regions are enlarged for clarity. Exemplary embodiments of the present disclosure should not be construed to be limited to shapes of regions shown herein, but to include deviations in shape due to, for example, manufacturing. For example, an etched region that is shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

FIG. 1 is a structural diagram of a tiled display device in accordance with some embodiments. Embodiments of the present disclosure provide a tiled display device 1. As shown in FIG. 1, the tiled display device 1 includes a plurality of display screens 10 connected to each other.

For example, every two adjacent display screens 10 of the plurality of display screens 10 are connected together by a fixing member, or the plurality of display screens 10 are fixed on a splicing bracket. A manner in which the plurality of display screens 10 are connected together to each other is not limited in the embodiments of the present disclosure, as long as the plurality of display screens 10 can be connected together.

For example, each display screen 10 can display an independent image, that is, the display screens 10 are independent of each other, so that a user may see different images simultaneously to obtain different information. For another example, the plurality of display screens 10 cooperate with each other to display a complete image, that is, each display screen 10 displays only a portion of the complete image. In this way, a display area of the image is increased, and a user may obtain a good visual effect.

Figure 2:
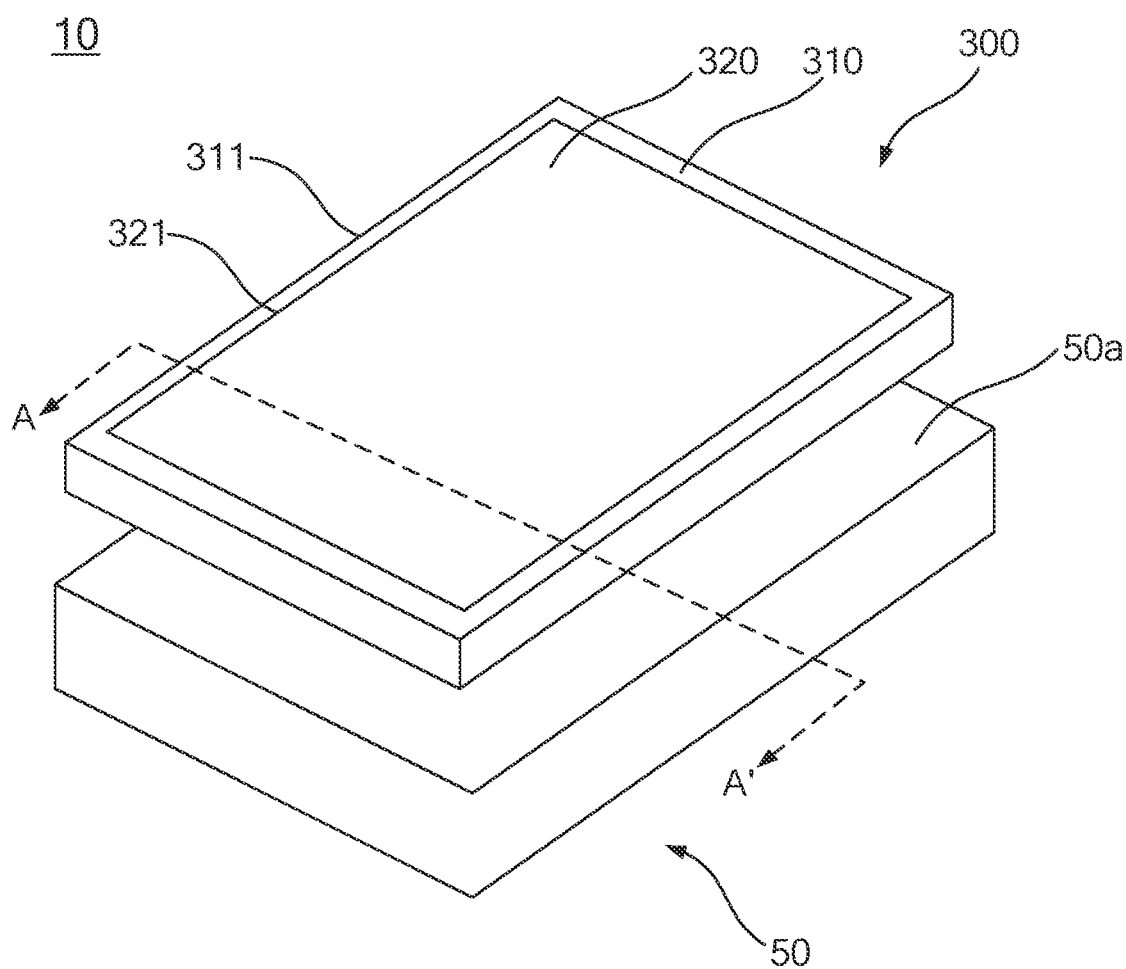
FIG. 2 is an exploded view of a display screen in accordance with some embodiments.
Figure 3:
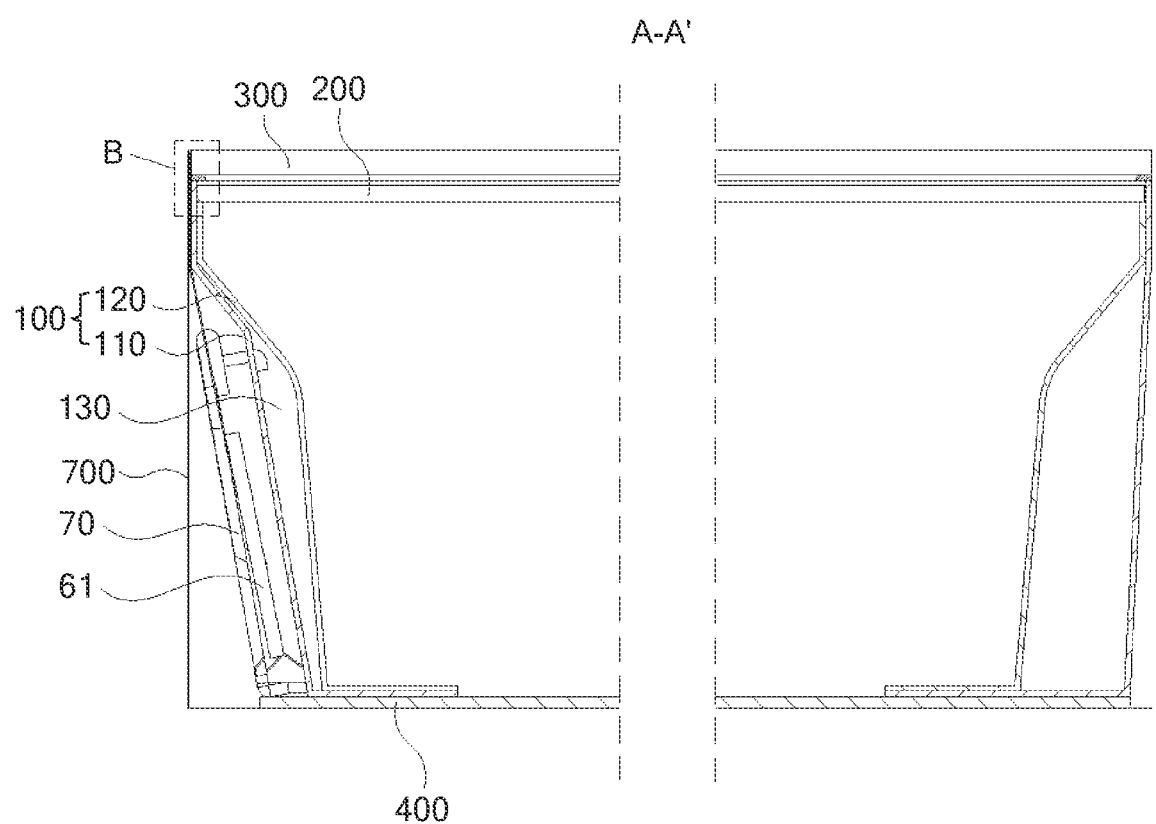
FIG. 3 is a sectional view taken along the line A-A' in FIG. 2.

FIG. 2 is an exploded view of a display screen in accordance with some embodiments. FIG. 3 is a sectional view taken along the line A-A' in FIG. 2; The embodiments of the present disclosure provide a display screen 10 applicable to the tiled display device 1. As shown in FIGS. 2 and 3, the display panel 10 includes a display panel 300 and a backlight module 50, and the display panel 300 is disposed above a light-emitting side 50a of the backlight module 50.

As shown in FIG. 2, the display panel 300 has a display region 320 and a non-display region 310 outside of the display region 320. For example, the non-display region 310 surrounds the display region 320. For another example, the non-display region 310 is located outside of a part of a periphery of the display region 310.

It will be understood that the display panel 300 is a liquid crystal display panel, and the backlight module 50 provides backlight for the display panel 300.

As shown in FIG. 3, the display screen 10 further includes a circuit board 61 electrically connected to the display panel 300. The circuit board 61 supplies signals to the display panel 300 to cause the display panel 300 to display an image.

The circuit board 61 is a flexible or rigid circuit board. In a case where the circuit board 61 is a rigid circuit board, the display screen 10 further includes a COF (chip on flex) 62 connected to both the display panel 300 and the circuit board 61, and a circuit board bracket 70 for fixing the circuit board 61. The circuit board bracket 70 may be fixed in the backlight module 50, or the circuit board bracket 70 may be a portion of the backlight module 50, or the circuit board bracket 70 may be outside of the backlight module 50, which is not limited in the embodiments of the present disclosure.

Figure 5:
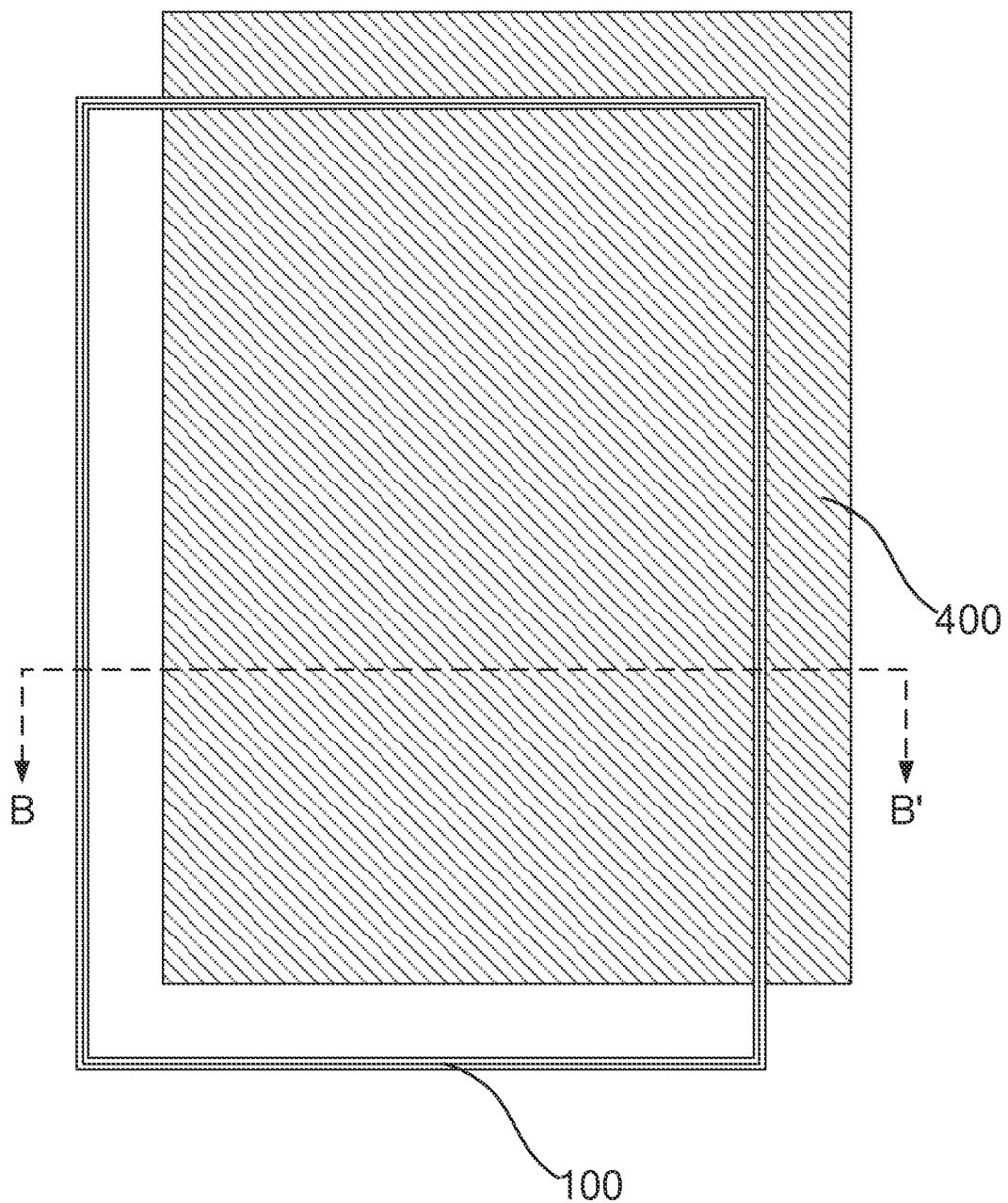
FIG. 5 is an exploded view of a backlight module in accordance with some embodiments.
Figure 6A:
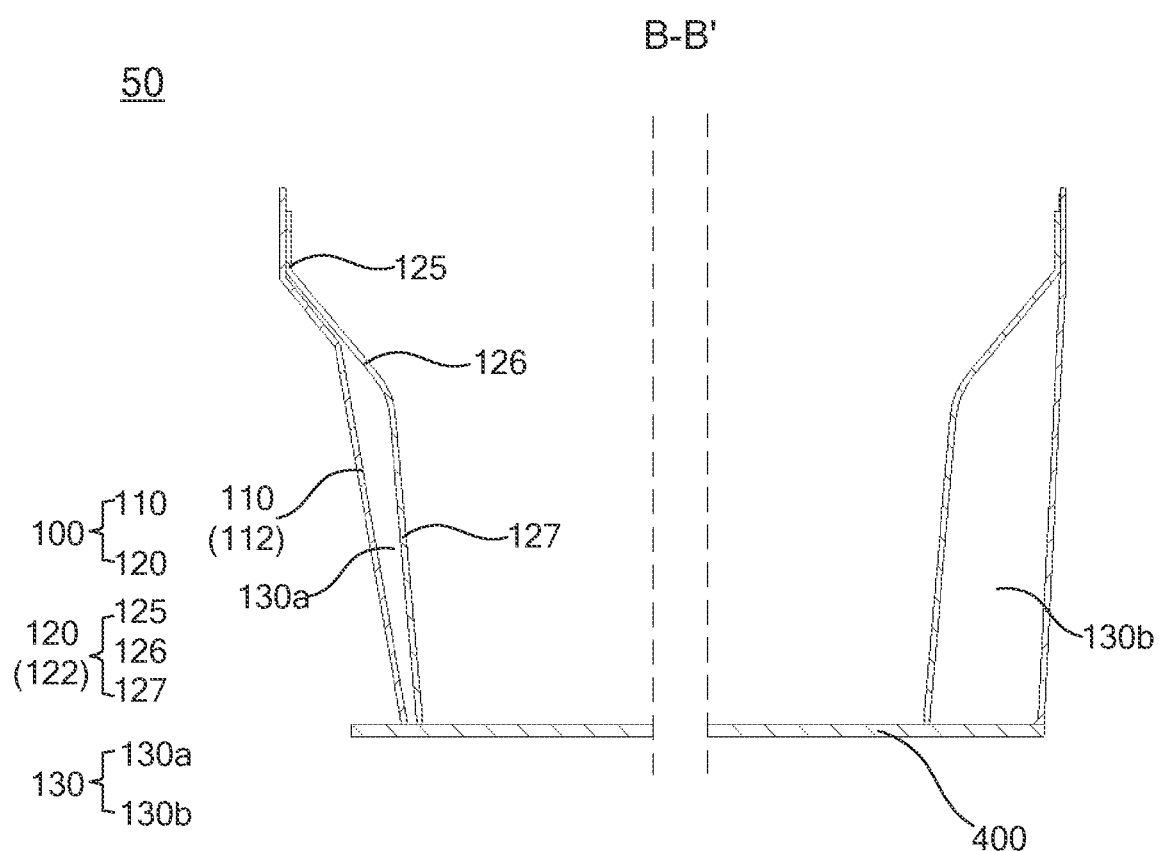
FIG. 6A is a sectional view taken along the line B-B' in FIG. 5.
Figure 6B:
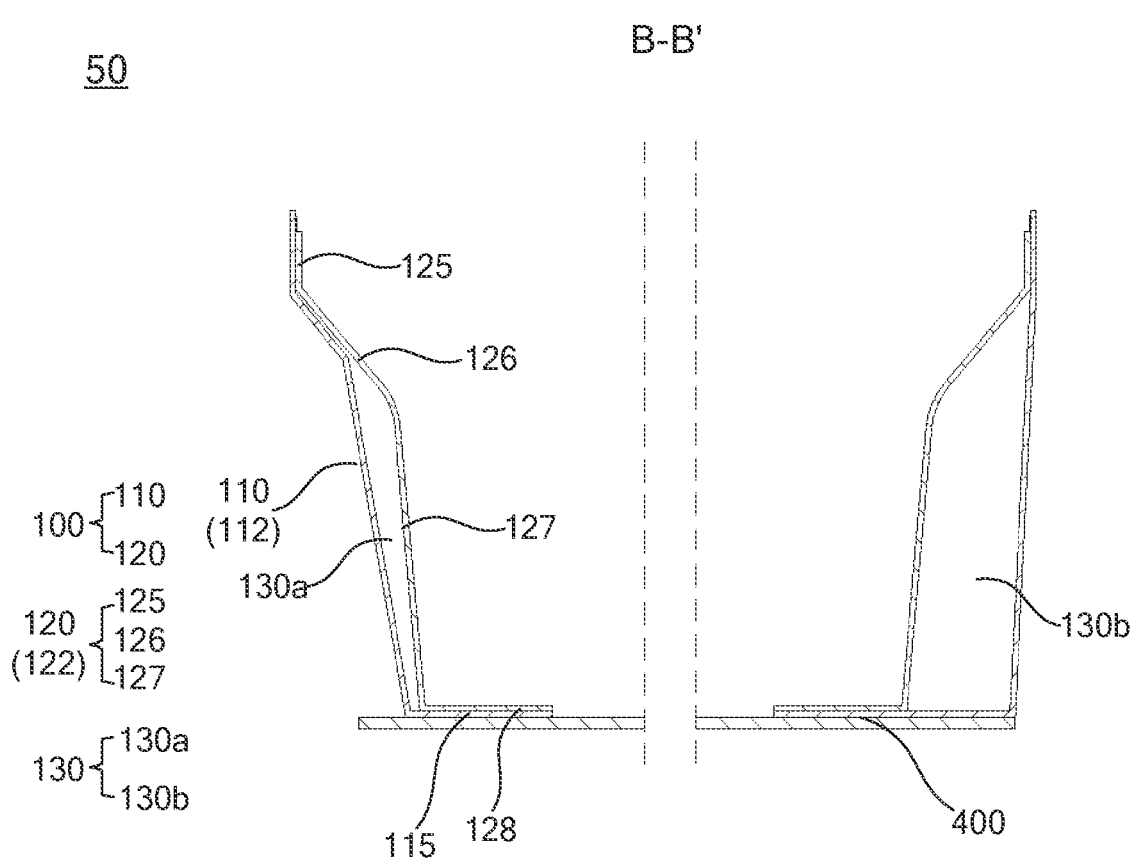
FIG. 6B is another sectional view taken along the line B-B' in FIG. 5.
Figure 7:
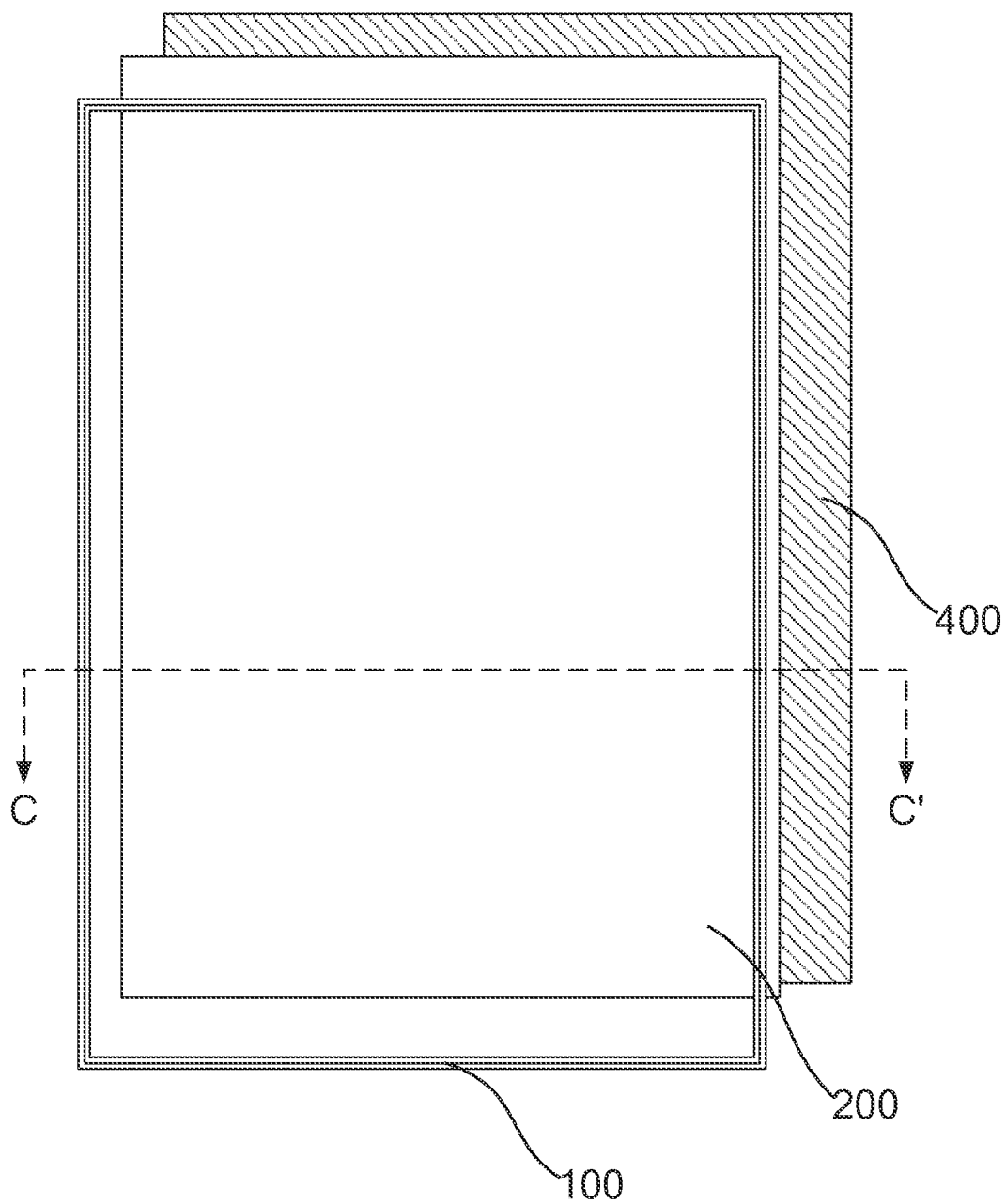
FIG. 7 is an exploded view of another backlight module in accordance with some embodiments.
Figure 8A:
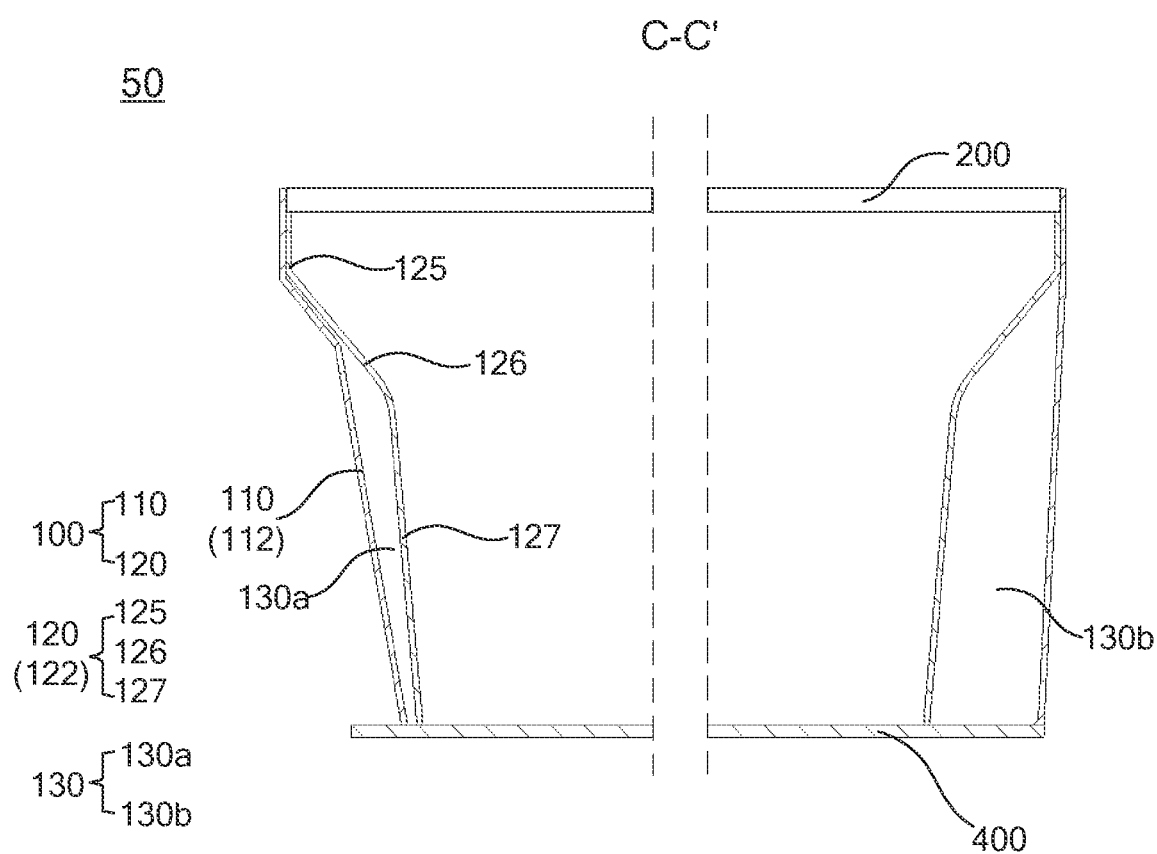
FIG. 8A is a sectional view taken along the line C-C' in FIG. 7.
Figure 8B:
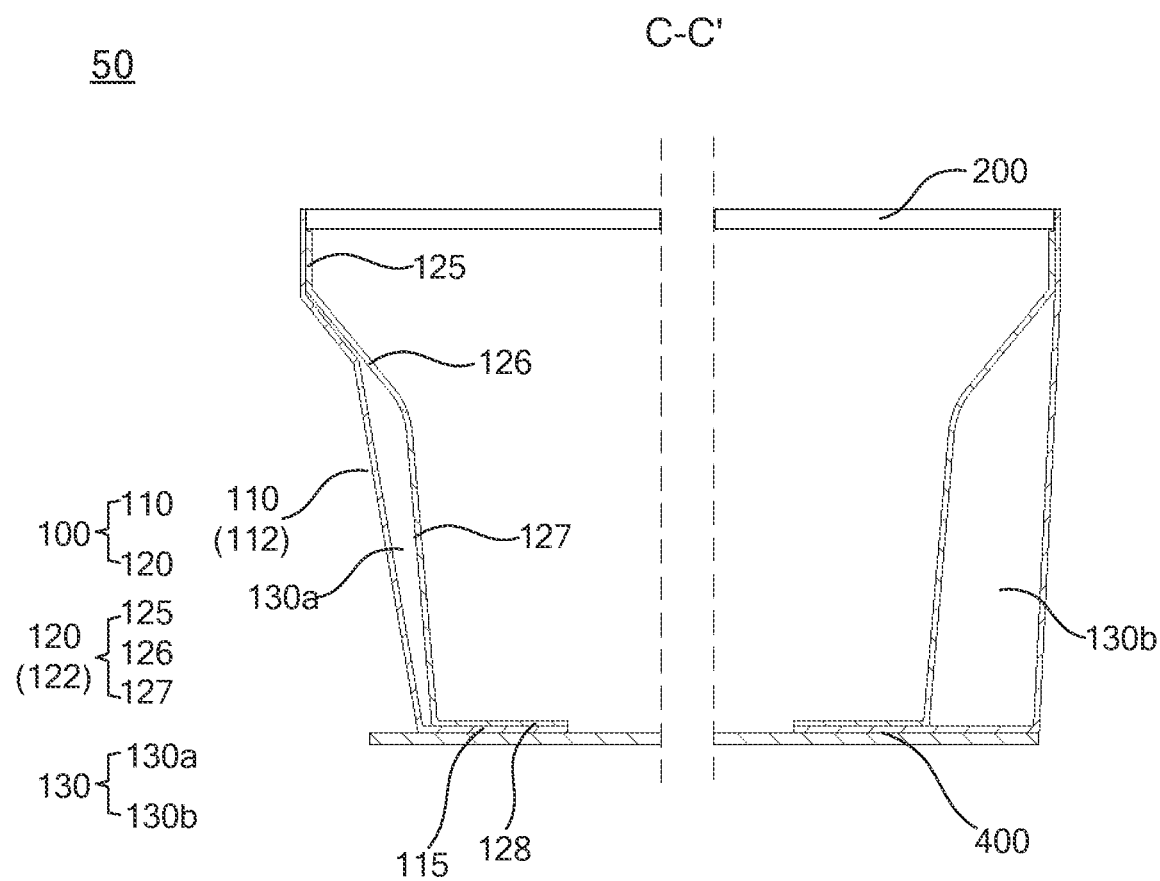
FIG. 8B is another sectional view taken along the line C-C' in FIG. 7.

FIG. 5 is an exploded view of a backlight module in accordance with some embodiments. FIG. 6A is a sectional view taken along the line B-B' in FIG. 5, and FIG. 6B is another sectional view taken along the line B-B' in FIG. 5. FIG. 7 is an exploded view of another backlight module in accordance with some embodiments. FIG. 8A is a sectional view taken along the line C-C' in FIG. 7, and FIG. 8B is another sectional view taken along the line C-C' in FIG. 7. The embodiments of the present disclosure provide a backlight module 50 applicable to the display screen 10, and as shown in FIGS. 5 to 8B, the backlight module 50 includes a back plate 400 and a middle frame assembly 100 disposed on the back plate 400.

In some embodiments, as shown in FIGS. 7 to 8B, the backlight module 50 further includes an optical film 200 disposed above a side of the middle frame assembly 100 facing away from the back plate 400.

For example, the backlight module 50 may be a direct-lit backlight module. That is, a light source in the backlight module 50 is located on a side of the optical film 200 facing the back plate 400, and emits light towards the optical film 200. In this case, the light source may include a plurality of light emitter (e.g., light-emitting diodes (LEDs) arranged in an array, and a light guide plate does not need to be provided in the backlight module 50.

For another example, the backlight module 50 may be an edge-lit backlight module, and in this case, the backlight module 50 further includes a light guide plate on a side of the optical film 200 facing the back plate 400. A light source in the backlight module 50 is located on one side or two opposite sides of the light guide plate, and emits light towards the light guide plate. The light guide plate converts light emitted by the light source into light emitted towards the optical film 200. In this case, the light source may include a light bar.

The optical film 200 includes at least one of a reflective sheet, a diffusion film and a brightness enhancement film. The reflective sheet and the diffusion film are mainly used for enhancing uniformity of light emitted by the light source, and the brightness enhancement film is mainly used for enhancing brightness of light emitted by the light source. In actual design, a specific composition of the optical film 200 may be selected according to requirements, and is not limited herein.

Generally, a tiled display device has one or more splicing gap, and a size of the splicing gap is primarily related to the width of the non-display region in the display panel of the display screen, that is, the size of the splicing gap is primarily related to a size of a middle frame in the backlight module, which fixes the display panel. For example, a width of the splicing gap of the tiled display device may be controlled within 1 mm (approximately equaling to the sum of the widths of the non-display regions in the display panels of two adjacent display screens that are connect together) to achieve a good display effect.

In a type of tiled display device, a middle frame used in a display screen in the tiled display device is made of plastic, and thus is also generally referred to as a plastic frame. In a case where the width of the splicing gap of the tiled display device is less than 1 mm, that is, a thickness of a portion of the middle frame facing the display panel in the display screen is controlled within 0.5 mm, a strength of the middle frame made of plastic is low due to a small thickness, and thus it is difficult for the middle frame made of plastic to stably support the display panel.

In another type of tiled display device, the middle frame is made through an aluminum extrusion process, and although a support requirement in a case where the thickness is less than 0.5 mm is met, the middle frame made through the aluminum extrusion process is not easily deformed. When the display panel expands with heat and contracts with cold due to temperature change in a use environment, the display panel will squeeze the middle frame to cause a possible crack between the middle frame and the optical film. Similarly, when the optical film expands with heat and contracts with cold due to the temperature change in the use environment, the optical film will squeeze the middle frame to cause a possible crack between the middle frame and the display panel.

In order to solve this problem, the embodiments of the present disclosure provide the backlight module 50, and in a case where the backlight module 50 is applied to the display screen 10, it is possible to avoid a problem that when one of the optical film 200 and the display panel 300 expands with heat and contracts with cold, a possible crack is caused between the the middle frame assembly 100 and the other one of the optical film 200 and the display panel 300.

Figure 9:
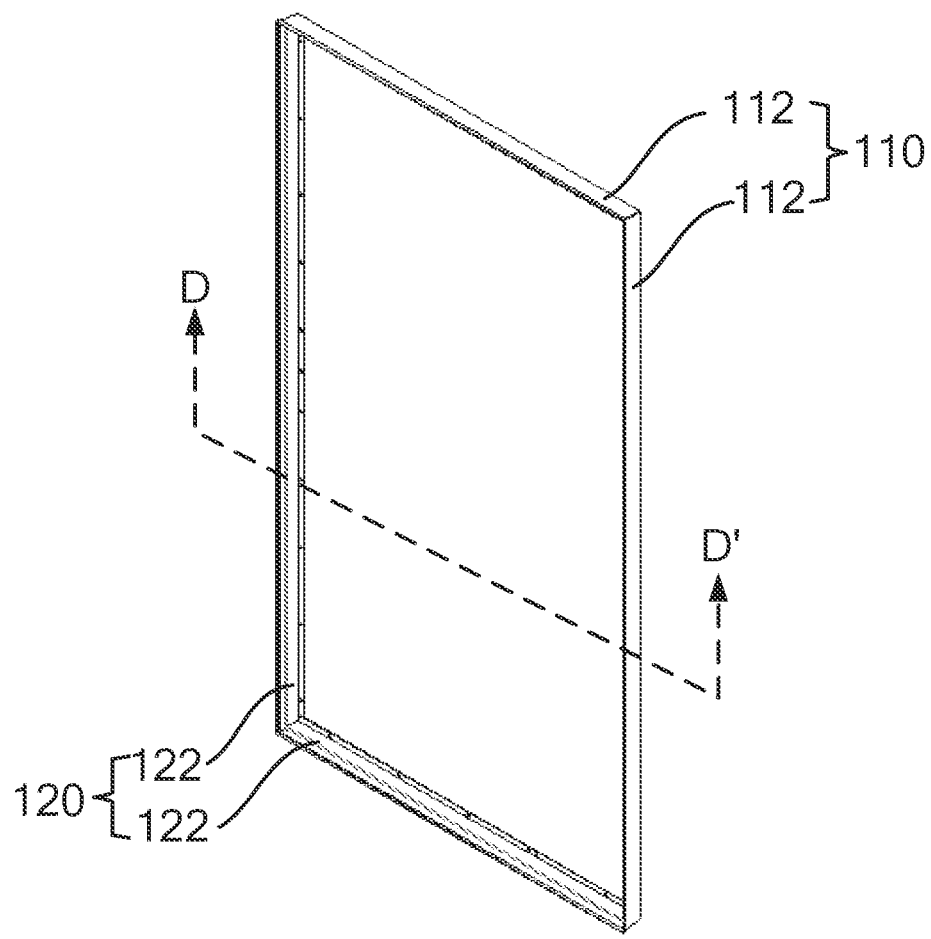
FIG. 9 is a structural diagram of a middle frame assembly in accordance with some embodiments.
Figure 10:
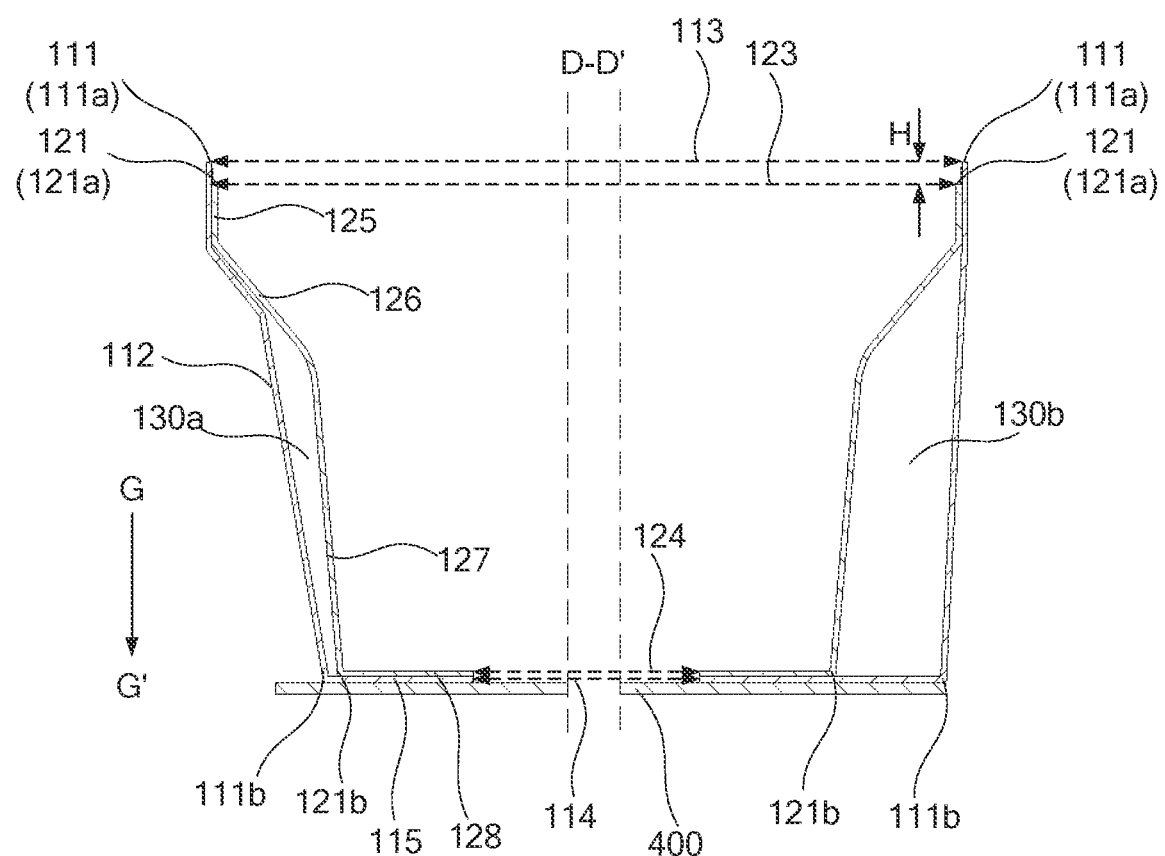
FIG. 10 is a sectional view taken along the line D-D' in FIG. 9.

FIG. 9 is a structural diagram of a middle frame assembly in accordance with some embodiments. FIG. 10 is a sectional view taken along the line D-D' in FIG. 9. As shown in FIGS. 3, 5 to 10, the middle frame assembly 100 includes a first frame body 110 and a second frame body 120. The first frame body 110 is sleeved outside of the second frame body 120. A deformation space 130 exists between the first frame body 110 and the second frame body 120, which allows the first frame body 110 and the second frame body 120 to be deformed.

Therefore, as shown in FIG. 3, when the display panel 300 expands with heat and contracts with cold due to the temperature change, the display panel 300 may squeeze the middle frame assembly 100, and since the first frame body 110 and the second frame body 120 in the middle frame assembly 100 are able to be deformed, a squeezing deformation of the display panel 300 to the middle frame assembly 100 may be offset, thereby avoiding a crack between the middle frame assembly 100 and the optical film 200. Similarly, when the optical film 200 expands with heat and contracts with cold due to the temperature change, a crack between the middle frame assembly 100 and the display panel 300 may also be avoided, which is not described herein again.

In some embodiments, as shown in FIGS. 9 and 10, the first frame body 110 includes a plurality of first side walls 112 connected in sequence, and the second frame body 120 includes a plurality of second side walls 122 connected in sequence. Each second side wall 122 is opposite to a respective one of the plurality of first side walls 112, and at least a portion of the deformation space 130 exists between at least one first side wall 112 and a second side wall 122 opposite thereto.

The above description of "at least a portion of the deformation space 130 exists between at least one first side wall 112 and a second side wall 122 opposite thereto" means that a gap (130a or 130b) exists between each of the at least one first side wall 112 and a second side wall 122 opposite thereto. That is, each of the at least one first side wall 112 and the second side wall 122 opposite thereto are not completely attached, and the gap 130a or 130b forms the at least a portion of the deformation space 130.

In addition, it will be understood that in a case where only one first side wall 112 and a second side wall 122 opposite thereto have a gap (130a or 130b) therebetween, the gap (130a or 130b) is the deformation space 130. In a case where each of the plurality of first side walls 112 and a second side wall 122 opposite thereto have a gap therebetween, these gaps forms the deformation space 130.

It will be noted that sectional shapes of the first frame body 110 and the second frame body 120 parallel to the back plate 400 are the same, and for example, may both be rectangular rings, triangular rings or circular rings, which are generally matched with a shape of the display region 310 of the display panel 300.

For example, in a case where the display region 310 is in a shape of a rectangle or in a shape of a triangle, the sectional shapes of the first frame body 110 and the second frame body 120 parallel to the back plate 400 are both rectangular rings or triangular rings, respectively. Accordingly, the first frame body 110 includes four first side walls 112 or three first side walls 112, and the second frame body 120 includes four second side walls 122 or three second side walls 122.

For another example, in a case where the display region 310 is in a shape of a circle, the sectional shapes of the first frame body 110 and the second frame body 120 parallel to the back plate 400 are both circular rings, and each first side wall 112 may be understood as a portion of the first frame body 110 in a circumferential direction. For example, if a circumference of the circle is divided into four portions, the first frame body 110 includes four first side walls 112; and if the circumference of the circle is divided into five portions, the first frame body 110 includes five first side walls 112. Similarly, each second sidewall 122 should be understood as such, and will not be described herein again.

Generally, the first frame body 110 and the second frame body 120 each have two frame openings. As shown in FIG. 10, end faces 111a of the plurality of first side walls 112 facing away from the back plate 400 are connected in sequence to form a first frame opening 113 (i.e., the first frame opening 113 is surrounded by the end faces 111a of the plurality of first side walls 112 facing away from the back plate 400), and end faces 111b of the plurality of first side walls 112 facing the back plate 400 are connected in sequence to form a second frame opening 114 (i.e., the second frame opening 114 is surrounded by the end faces 111b of the plurality of first side walls 112 facing the back plate 400); end faces 121a of the plurality of second side walls 122 facing away from the back plate 400 are connected in sequence to form a third frame opening 123 (i.e., the third frame opening 123 is surrounded by end faces 121a of the plurality of second side walls 122 facing away from the back plate 400), and end faces 121b of the plurality of second side walls 122 facing the back plate 400 are connected in sequence to form a fourth frame opening 124 (i.e., the fourth frame opening 124 is surrounded by the end faces 121b of the plurality of second side walls 122 facing the back plate 400).

The middle frame assembly 100 is used for supporting and fixing the display panel 300 and the optical film 200. Portions of the middle frame assembly 100 connected to the display panel 300 and the optical film 200 are as follows.

As shown in FIGS. 3 and 10, the first frame body 110 is used for supporting the display panel 300, the end faces 111a of the plurality of first side walls 112 facing away from the back plate 400 form a first supporting surface 111, and the first supporting surface 111 are fixedly connected to the display panel 300, so as to support and fix the display panel 300.

Figure 4:
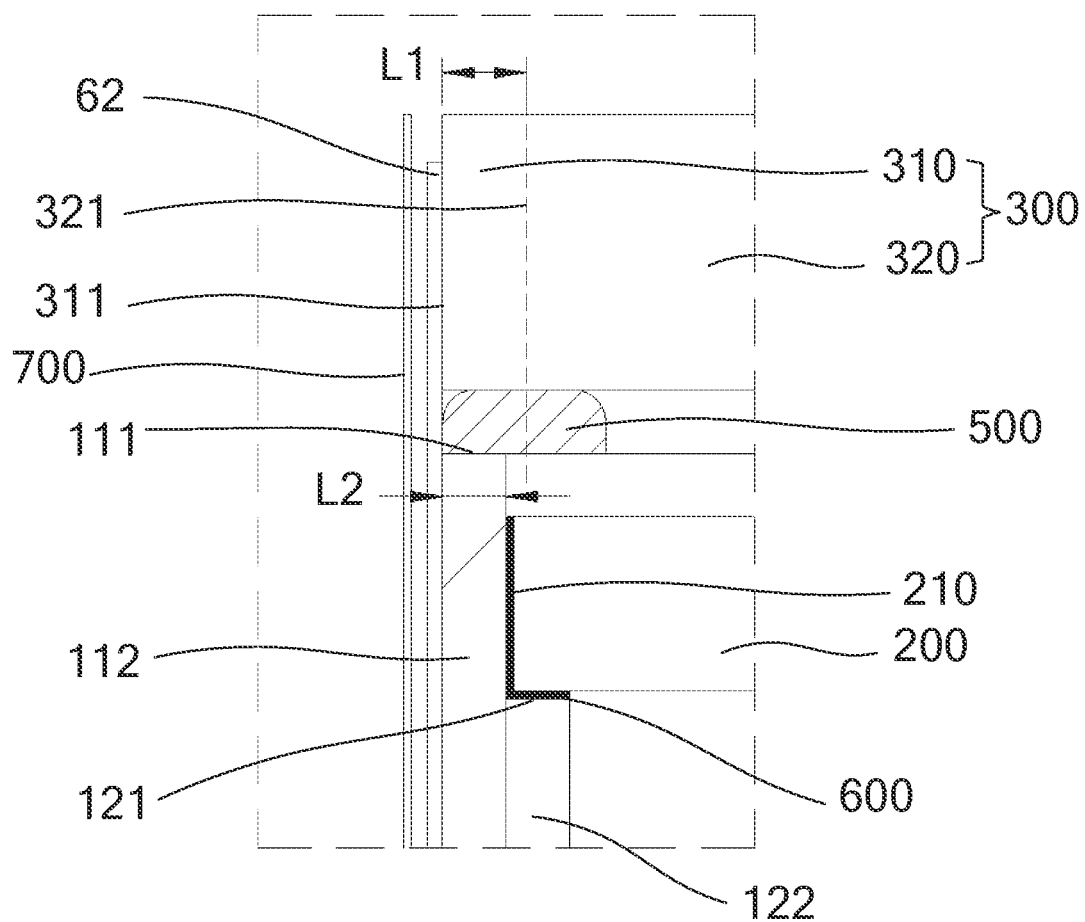
FIG. 4 is a partial enlarged view illustrating the part B in FIG. 3.

In some embodiments, as shown in FIGS. 2 to 4, the non-display region 310 of the display panel 300 is fixed to the first supporting surface 111. In order not to affect normal display of the display region 320, a distance L1 between a border 311 of the non-display region 310 and a border 321 of the display region 320 should be greater than or equal to a thickness L2 of a portion of each first side wall 112 connected to the non-display region 320, thereby preventing the first side walls 112 from blocking the display region 320 and ensuring the normal display of the display region 320.

Here, the distance between the border 311 of the non-display region 310 and the border 321 of the display region 320 refers to a width of a portion of the non-display region 310 on a side of a periphery of the display region 320.

FIG. 4 is a partial enlarged view illustrating the part B in FIG. 3. In some embodiments, the first supporting surface 111 and the display panel 300 may be fixed to one another by adhesion. As shown in FIG. 4, the display screen 10 further includes a first adhesive layer 500 located between the first supporting surface 111 and the display panel 300, so as to achieve fixing between the first supporting surface 111 and the display panel 300.

In some embodiments, the first adhesive layer 500 is made of optical adhesive (e.g., optical clear adhesive (OCA)). Since the optical adhesive has characteristics of colorlessness and transparency, light transmittance of more than 90 percent, good bonding strength, capability of being cured at room temperature or intermediate temperature, and small curing shrinkage and the like, the optical adhesive may be used for bonding the first supporting surface 111 and the display panel 300, and the adhesive effect is good.

The optical adhesive may also be a photocurable adhesive. The optical adhesive may be uniformly coated on the first supporting surface 111 by using a glue dispenser. Then, the display panel 300 and the first frame body 110 are aligned and fastened. Finally, the display panel 300 and the first frame body 110 that are fastened together are irradiated by ultraviolet light, so that the photocurable adhesive is cured to achieve the bonding purpose.

As shown in FIGS. 3, 4, 8A, 8B and 10, the second frame body 120 is used for supporting the optical film 200. The end faces 121a of the plurality of second side walls 122 facing away from the back plate 400 form a second supporting surface 121.

As shown in FIG. 10, a distance between the first frame opening 113 and the second frame opening 114 is greater than a distance between the third frame opening 123 and the second frame opening 114, and a distance H between the first frame opening 113 and the third frame opening 123 is greater than or equal to a thickness of the optical film 200. Therefore, through the above arrangement, the second frame body 120 can expose a portion of the first frame body 110 away from the back plate 400, thereby forming a space capable of accommodating the optical film 200.

It will be noted that setting the distance H between the first frame opening 113 and the third frame opening 123 to be greater than the thickness of the optical film 200 also enables the first supporting surface 111 of the first frame body 110 to effectively support the display panel 300. That is, a distance between the display panel 300 and the second supporting surface 121 is greater than the thickness of the optical film 200, so that the display panel 300 is not in contact with the optical film 200, and the display panel 300 is supported by the first supporting surface 111.

In some embodiments, the second supporting surface 121 and the optical film 200 may be fixed to one another by adhesion. As shown in FIG. 4, the display screen 10 further includes a second adhesive layer 600 located between the second supporting surface 121 and the optical film 200, so as to achieve fixing between the second supporting surface 121 and the optical film 200.

In some embodiments, the second adhesive layer 600 is a transparent double-sided tape, which has advantages of high tensile strength, long-lasting peeling force and adhesive force, water resistance, high temperature resistance and the like. It may be used for adhering the second supporting surface 121 and the optical film 200, and have a good adhesive effect.

In order to achieve adhesion between the optical film 200 and both the first frame body 110 and the second frame body 120 to improve a structural stability of the backlight module 50, as shown in FIG. 4, the second frame body 120 exposes a portion of each first side wall 112 away from the back plate 400. The optical film 200 has a plurality of side edges 210, and each side edge 210 faces a portion of one first side wall 112 exposed by the second frame body 120. The second adhesive layer 600 is further located between at least one side edge 210 of the optical film 200 and the first side wall 112 opposite thereto, so that the optical film 200 is adhered to both the first frame body 110 and the second frame body 120, and the optical film 200 is adhered more firmly.

In order to enhance firmness and aesthetics of the display screen 10, as shown in FIGS. 3 and 4, the display screen 10 further includes an appearance tape 700 adhered to a periphery of the middle frame assembly 100, thereby increasing firmness of the middle frame assembly 100, the backlight module 50 and the display screen 10, and also improving overall aesthetics of the display screen 10.

Here, the appearance tape 700 is a tape having appearance characteristics such as a certain color and/or pattern.

In some embodiments, as shown in FIG. 10, a portion of the first side wall 112 proximate to the first frame opening 113 is in contact with a portion of the opposite second side wall 122 proximate to the third frame opening 123. For example, the two portions are attached together. A gap 130a exists between a remaining portion of the first side wall 112 and a remaining portion of the second side wall 122, and the gap 130a forms the at least a portion of the deformation space 130. That is, there is no contact between the remaining portion of the first side wall 112 and the remaining portion of the second side wall 122, and there is a certain distance therebetween.

In this way, that the portions of the first side wall 112 and the opposite second side wall 122 proximate to the first frame opening 113 (i.e., proximate to the display panel 300) are attached to one another enables the first side wall 112 and the second side wall 122 to form a support between one another to prevent the second frame 120 from shaking on an inner side of the first frame body 110.

That the gap 130a between the remaining portion of the first side wall 112 and the remaining portion of the second side wall 122 forms the at least a portion of the deformation space 130 enables the first side wall 112 and the second side wall 122 to be slightly deformed without affecting an overall support structure.

In some embodiments, as shown in FIG. 10, the second side wall 122 includes a first sub-side wall 125, a second sub-side wall 126 and a third sub-side wall 127 that are connected in sequence in a direction G-G' from the third frame opening 123 to the fourth frame opening 124.

The first sub-side wall 125 is attached to the first side wall 112 corresponding to the second side wall 122. The second sub-side wall 126 is bent facing away from the first side wall 112 relative to the first sub-side wall 125. The third sub-side wall 127 is bent towards the first side wall 112 relative to the second sub-side wall 126, and the third sub-side wall 127 is fixedly connected (e.g., fixedly connected by screws) to the back plate 400. A gap 130a between the second sub-side wall 126 and and the first side wall 112 and a gap 130a between the third sub-side wall 127 and the first side wall 112 form at least a portion of the deformation space 130. That is, the second sub-side wall 126 and the third sub-side wall 127 are not in contact with the first side wall 112, and a certain distance exists between the second sub-side wall 126 and the first side wall 112 and between the third sub-side wall 127 and the first side wall 112.

Setting each portion of the second side wall 122 as the above structure enables the second frame body 120 to be formed with two bending portions thereon, i.e., a connection portion between the first sub-side wall 125 and the second sub-side wall 126 and a connection portion between the second sub-side wall 126 and the third sub-side wall 127. Since the first sub-side wall 125 is attached to the first side wall 112, and both the first frame body 110 and the second frame body 120 are fixedly connected to the back plate 400, when the first frame body 110 or the second frame body 120 is stressed, bending angles of the two bending portions may be slightly changed, and the two bending portions form a support between one another to limit positions of the two bending portions to absorb a force of deformation. As a result, the middle frame assembly 100 may be slightly deformed, but the whole structure is not deformed, and a whole support strength is not weakened, thereby avoiding a situation that a connection structure between the middle frame assembly 100 and the display panel 300 and a connection structure between the middle frame assembly 100 and the optical film 200 are split due to deformation.

It will be noted that the second frame body 120 may have the above-mentioned structure through a bending process. Bending angles of the second frame body 120 may be changed according to an actual working condition and a size of the display panel 300 matched with the backlight module 50, which is not limited in the embodiments of the present disclosure.

In order to facilitate fixing of the first frame body 110 and the second frame body 120 to the back plate 400, in some embodiments, as shown in FIGS. 6B, 8B and 10, the first frame body 110 further includes a first flanging edge 115 connected to the second frame opening 114, and the second frame body 120 further includes a second flanging edge 128 connected to the fourth frame opening 124. Both the second flanging edge 128 and the first flanging edge 115 are fixedly connected to the back plate 400. Here, the flanging edge may be a strip extending from a corresponding side wall and approximately parallel to the back plate 400, which generally has a small width.

The first flanging edge 115 increases a contact area between the first frame body 110 and the back plate 400, which facilitates the fixing between the first frame body 110 and the back plate 400. Similarly, the second flanging edge 128 increases a contact area between the second frame body 120 and the back plate 400, which facilitates the fixing between the second frame body 120 and the back plate 400.

In some other embodiments, the first frame body 110 is provided with the first flanging edge 115, and the second frame body 120 is not provided with the second flanging edge 128. In yet some other embodiments, the first frame body 110 is not provided with the first flanging edge 115, and the second frame body 120 is provided with the second flanging edge 128.

In a possible implementation manner, the first flanging edge 115 and the back plate 400 may be fixed by bonding, screwing, riveting, or the like. In order to simplify an installation process, the first flanging edge 115 and the back plate 400 are fixed by one or more screws to make the installation simpler. Similarly, the second flanging edge 128 and the back plate 400 are also fixed by one or more screws, which will not be described herein again.

In another possible implementation, the first flanging edge 115 may be connected to the inner side (i.e., located in the second frame opening 114) or an outer side (i.e., located outside of the second frame opening 114) of the first frame body 110. In order to reduce an overall size of the first frame body 110, the first flanging edge 115 is connected to the inner side of the first frame body 110, so that the first flanging edge 115 is located on the inner side of the first frame body 110, which is beneficial to reducing the overall size of the first frame body 110, thereby enabling the middle frame assembly 100 to have a light and thin structure. Similarly, the second flanging edge 128 may also be connected to the inner side of the second frame body 120 and located on a side of the first flanging edge 115 facing away from the back plate 400, which will not be described herein again.

In this case, the one or screws may extend through the second flanging edge 128 and the first flanging edge 115 in sequence, so that the second flanging edge 128 and the first flanging edge 115 are fixed to the back plate 400. Or the second flanging edge 128 may be fixed to the first flanging edge 115 by one screw, the first flanging edge 115 may be fixed to the back plate 400 by another screw, and then the three structures may also be fixed to each other, which is not limited in the embodiments of the present disclosure.

In some embodiments, as shown in FIG. 3, a portion of each of at least one first side wall 112 proximate to the second frame opening 114 is inclined towards the second side wall 122 opposite to the first side wall 112, that is, the first side wall 112 is a bending side wall. In this way, an installation space may be formed on a side of the first side wall 112 facing away from the second side wall 122, in which the circuit board 61 and other structures in the display screen 10 may be installed, which is beneficial to reducing a volume of the display screen 10.

In some embodiments, the at least one first side wall 112 includes two adjacent first side walls 112. That is, in the first frame body 110, two adjacent first side walls 112 are inclined towards the second side walls 122 opposite thereto, respectively, thereby forming two installation spaces and increasing the installation positions and the installation number of circuit boards 61 to fit different types of display screens 10.

In some embodiments, in a case where a second side wall 122, opposite to the bending first side wall 112, includes a first sub-side wall 125, a second sub-side wall 126 and a third sub-side wall 127 that are connected in sequence, the bending first side wall 112 may also include three sub-side walls connected in sequence, each of which has an inclination manner similar to that of a corresponding sub-side wall of the second side wall 122, which will not be repeated here. In the bending first side wall 112, one sub-side wall farthest away from the back plate 400 is attached to the first sub-side wall 125, and a portion of the deformation space 130 is formed between the remaining sub-side walls of the bending first side wall 112 and the remaining sub-side walls of the second side wall 122.

In addition, as shown in FIGS. 3, 6A, 6B, 8A, 8B and 10, in a case where the installation space is formed at a portion of the first sidewall 112 facing away from the opposite second side wall 122, a gap 130B between the first side wall 112 where no installation space is formed and the opposite second side wall 122 may be larger than a gap 130a between the first side wall 112 where an installation space is formed and the opposite second side wall 122, so as to increase a volume of the deformation space 130.

Of course, the number and the position of first side walls 112 that are bent are not fixed, and there may be other numbers or positions, and thus the number and the position may be adjusted adaptively according to a specific structure, and are not limited thereto.

In some embodiments, the first frame body 110 and the second frame body 120 are both made of cold-rolled carbon steel. The cold-rolled carbon steel is produced by rolling a hot-rolled coil as a raw material at a temperature below the recrystallization temperature at normal temperature, and has high hardness because of no annealing treatment, and a thickness of a cold-rolled carbon steel sheet is generally between 0.1 mm and 8.0 mm.

Thus, in a case where the width of the splicing gap in the tiled display device is required to be less than 1 mm, the middle frame assembly 100 in the embodiments of the disclosure is made of two layers of the cold-rolled carbon steel sheet each with a thickness of less than 0.5 mm (e.g., a thickness of 0.4 mm). For example, a thickness of a portion of the first side wall 112 connected to the non-display region 310 (i.e., a width of an end face 111a of the first side wall 112) is approximately 0.4 mm. Or a thickness of each portion of the first side wall 112 is approximately 0.4 mm. In addition, a thickness of the second side wall 122 may be approximately 0.4 mm. Since the second frame body 120 exposes a portion of the first frame body 110 away from the back plate 400, that is, the second side wall 122 is retracted relative to the first side wall 112, an area of a portion of the middle frame assembly 100 connected to the display panel 300 is reduced. In this way, since a hardness of the cold-rolled carbon steel is high, a supporting strength for supporting the display panel 300 may be still satisfied on a premise that a thickness (e.g., approximately 0.4 mm) of the first side wall 112 for supporting the display panel 300 is less than a width (e.g., 0.5 mm) of the non-display region 310 of the display panel 300, thereby forming a stable supporting structure.

In some embodiments, the middle frame assembly 100 is made of two layers of the cold-rolled carbon steel sheet each with a thickness of 0.4 mm, which not only meets a size requirement of the splicing gap on the middle frame assembly 100, but also enhances a structural strength of the middle frame assembly 100.

Figure 11:
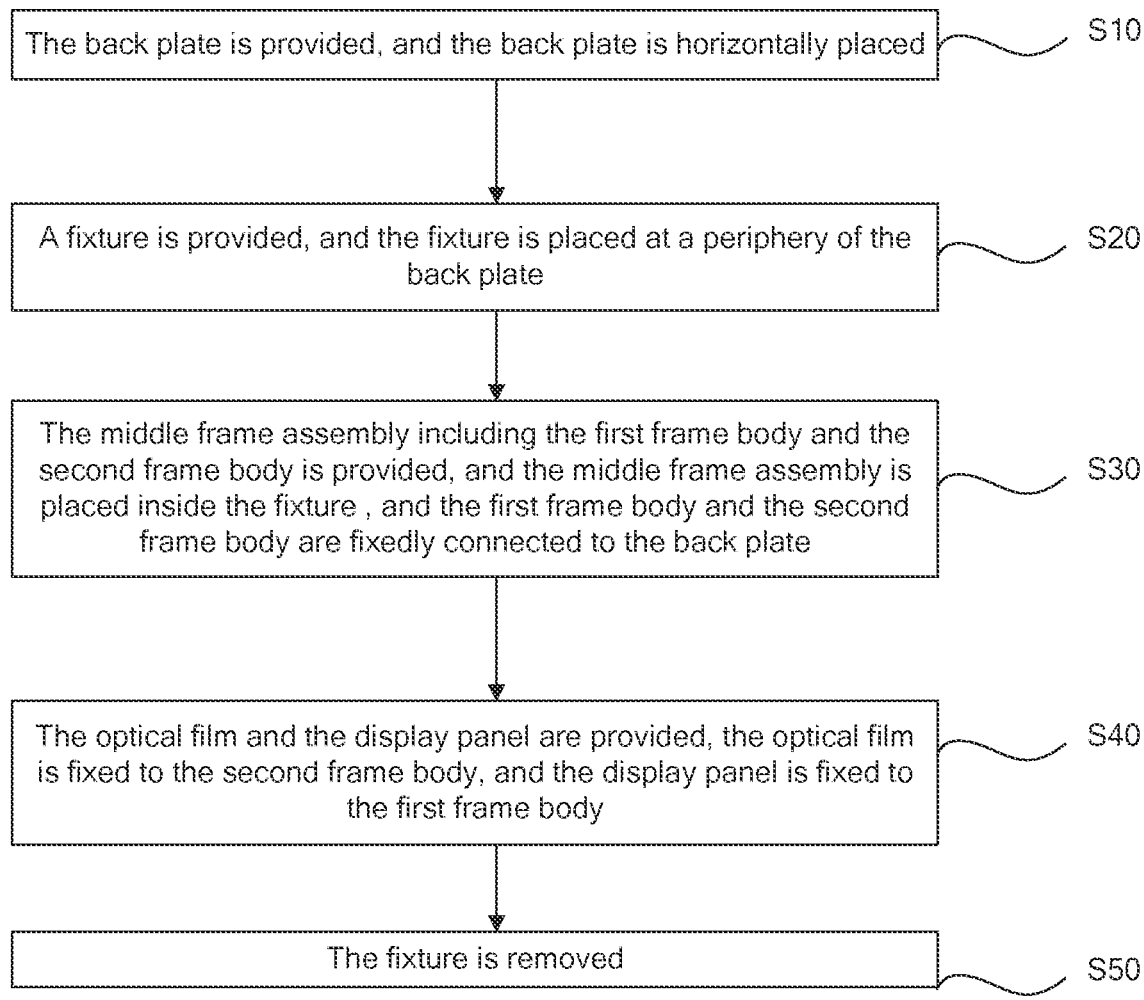
FIG. 11 is a flow diagram of a method for assembling a display screen in accordance with some embodiments.

FIG. 11 is a flow diagram of a method for assembling the display screen in accordance with some embodiments. FIGS. 12A to 12D are assembly process diagrams of a method for assembling the display screen in accordance with some embodiments. As shown in FIG. 11, an assembly process of the display screen 10 of the embodiments of the present disclosure includes the following steps.

Figure 12A:
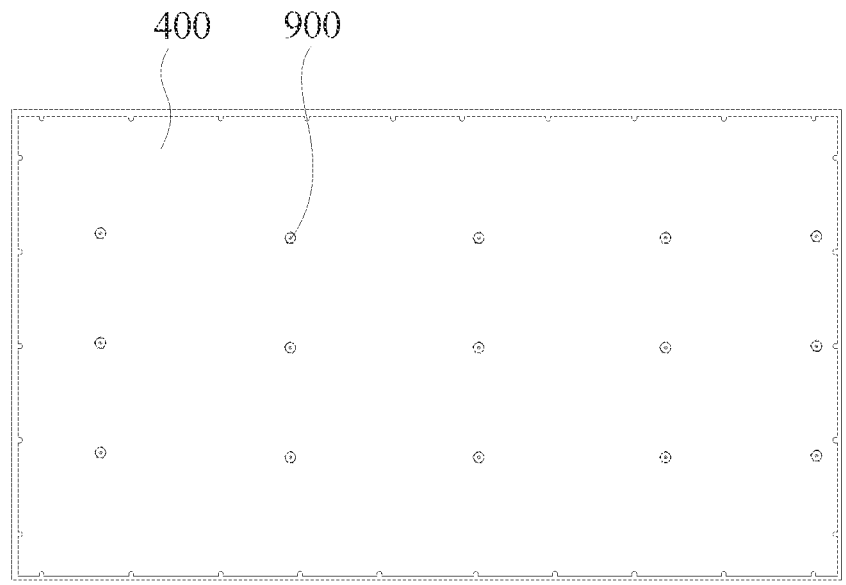
FIGS. 12A to 12D are assembly process diagrams of a method for assembling a display screen in accordance with some embodiments.

In S10, the back plate 400 is provided and the back plate 400 is horizontally placed. As shown in FIG. 12A, the light source 900 for providing light for the display screen 10 is disposed on the back plate 400. The light source 900 may include a plurality of LEDs arranged in an array, a plurality of LED light bars arranged at intervals or other light emitters, which is not limited herein.

In S20, a fixture 800 is provided, and the fixture 800 is placed at a periphery of the back plate 400.

Figure 12B:
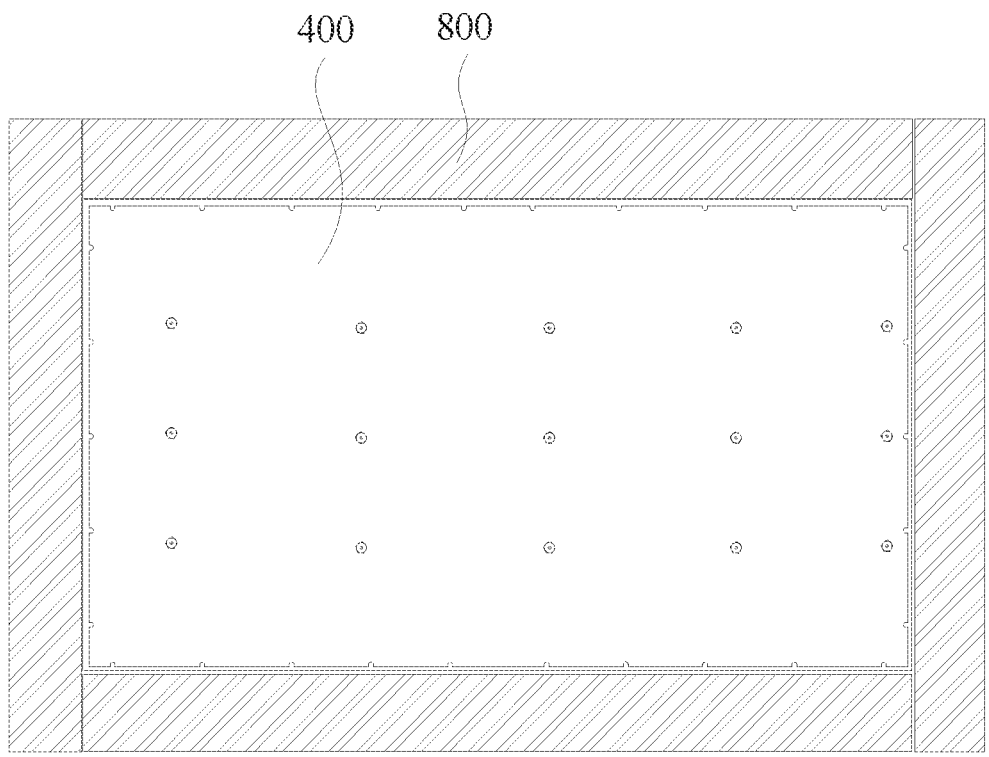

During the installation process of the middle frame assembly 100 and the display panel 300, if the position of the middle frame assembly 100 is shifted relative to the display panel 300, the display panel 300 may be poorly attached and at risk of dropping. Moreover, it is possible to cause that an edge of the display panel 300 protrudes outside of the middle frame assembly 100, and the display panel 300 is at risk of corner breakage. On this basis, as shown in FIG. 12B, the fixture 800 is provided. The fixture 800 is a frame-shaped assembling tool and is placed at the periphery of the back plate 400 to fix the back plate 400. In this way, the fixture 800 can limit the position of the middle frame assembly 100 during the installation process, thereby avoiding the above defects and ensuring that the non-display region 310 of the display panel 300 may be matched with, adhered to and fixed with the first supporting surface after the display screen 10 is assembled.

In S30, the middle frame assembly 100 including the first frame body 110 and the second frame body 120 is provided and is placed inside the fixture 800, and the first frame body 110 and the second frame body 120 are fixedly connected to the back plate 400.

Figure 12C:
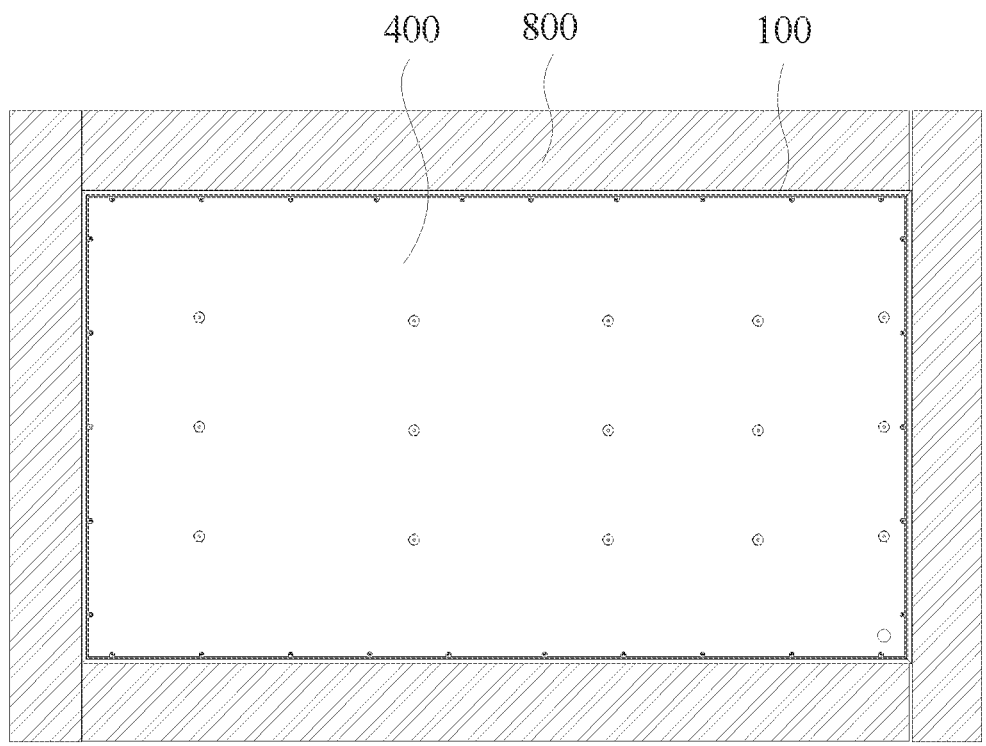

As shown in FIG. 12C, the middle frame assembly 100 is placed inside the fixture 800, and its size and position are defined by the fixture 800 to achieve high installation accuracy.

In S40, the optical film 200 and the display panel 300 are provided, the optical film 200 is fixed to the second frame body 120, and then the display panel 300 is fixed to the first frame body 110.

Figure 12D:
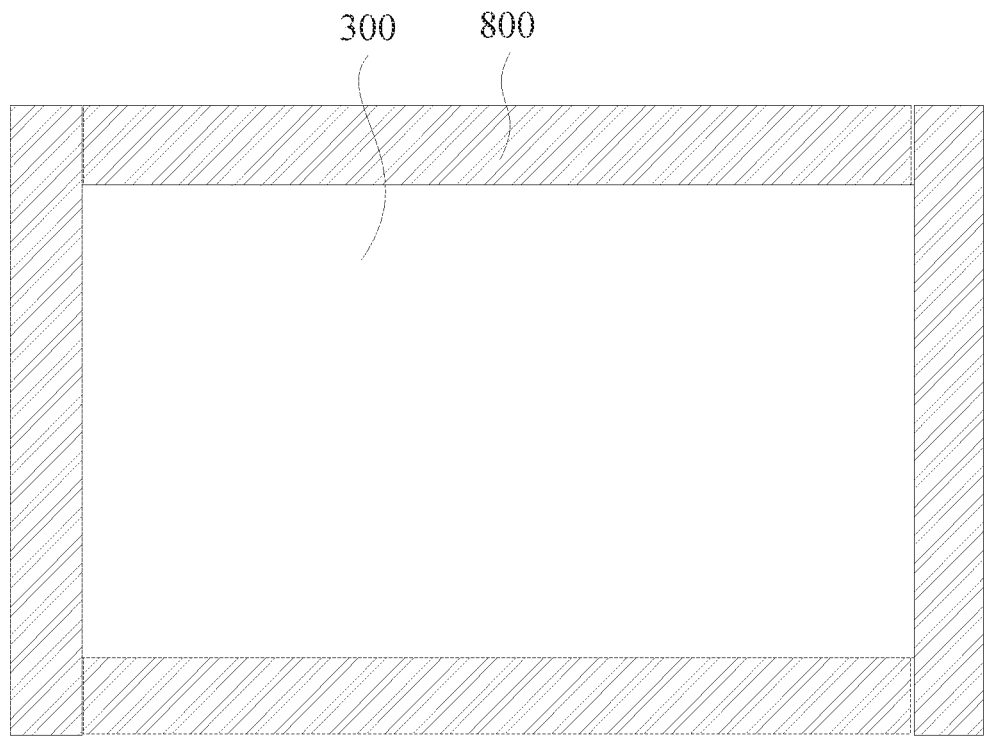

For example, the optical film 200 is adhered to the second frame body 120, and then the display panel 300 is adhered to the first frame body 110. The display panel 300 covers the optical film 200, and thus only the display panel 300 and the fixture 800 are shown in FIG. 12D from a top view.

In S50, the fixture 800 is removed. After the assembly is completed, the fixture 800 is removed, and the display screen 10 shown in FIG. 2 is obtained.

It will be understood that an installation process of the whole display screen 10 may also involve the installation of some other structures, such as the installation of the circuit board 61 and the circuit board bracket 70. A step of installing the circuit board bracket 70 and the circuit board 61 may be performed between S30 and S40. Of course, the circuit board 61 may be directly installed to the circuit board bracket 70 before S30, and then the circuit board bracket 70 is installed to the middle frame assembly 100, and afterwards S30 may be performed, which is not limited herein. In a case that the display screen 10 further includes the COF 62, a step of installing the COF 62 may be performed after S40, or the display panel 300 provided with the COF 62 may be provided in S40, which is not limited here.

The foregoing descriptions are merely some specific implementation manners of the present disclosure, but the protection scope of the present disclosure is not limited thereto, and changes or replacements that any person skilled in the art could conceive of within the technical scope disclosed by the present disclosure should be within the protection scope of the present disclosure. Therefore, the protection scope of the present disclosure shall be subject to the protection scope of the claims.

What is claimed is:

1. A backlight module, comprising:
   a back plate; and
   a middle frame assembly disposed on the back plate, the middle frame assembly including:
   a first frame body; and a second frame body; wherein
the first frame body is sleeved outside of the second frame body, and the first frame body and the second frame body have a deformation space therebetween;
the first frame body includes a plurality of first side walls connected in sequence;
the second frame body includes a plurality of second side walls connected in sequence, and each second side wall is opposite to a respective one of the plurality of first side walls; and
at least one first side wall and a second side wall opposite thereto have at least a portion of the deformation space therebetween.

2. The backlight module according to claim 1, wherein each first side wall and a second side wall opposite thereto have a respective portion of the deformation space therebetween.

3. The backlight module according to claim 1, wherein
end faces of the plurality of first side walls facing away from the back plate are connected in sequence to form a first frame opening, and end faces of the plurality of first side walls facing the back plate are connected in sequence to form a second frame opening;
end faces of the plurality of second side walls facing away from the back plate are connected in sequence to form a third frame opening, and end faces of the plurality of second side walls facing the back plate are connected in sequence to form a fourth frame opening;
a distance between the first frame opening and the second frame opening is greater than a distance between the third frame opening and the second frame opening; and
the backlight module further comprises an optical film disposed at the third frame opening, a thickness of the optical film is less than or equal to a distance between the first frame opening and the third frame opening.

4. The backlight module according to claim 3, wherein
a portion of the at least one first side wall proximate to the first frame opening is in contact with a portion of the second side wall proximate to the third frame opening; and
a gap between a remaining portion of the at least one first side wall and a remaining portion of the second side wall forms the at least a portion of the deformation space.

5. The backlight module according to claim 4, wherein the second side wall includes a first sub-side wall, a second sub-side wall and a third sub-side wall that are connected in sequence in a direction from the third frame opening to the fourth frame opening; wherein
the first sub-side wall is in contact with the at least one first side wall;
the second sub-side wall is inclined facing away from the at least one first side wall relative to the first sub-side wall;
the third sub-side wall is inclined towards the at least one first side wall relative to the second sub-side wall; and
the gap between the remaining portion of the at least one first side wall and the remaining portion of the second side wall includes a gap between the second sub-side wall and a first side wall and a gap between the third sub-side wall and the first side wall.

6. The backlight module according to claim 3, wherein a portion of at least one first side wall proximate to the second frame opening is inclined towards a second side wall opposite to the at least one first side wall.

7. The backlight module according to claim 6, wherein the at least one first side wall includes two adjacent first side walls.

8. The backlight module according to claim 3, wherein
the first frame body further includes a first flanging edge connected to the second frame opening; and/or
the second frame body further includes a second flanging edge connected to the fourth frame opening.

9. The backlight module according to claim 8, wherein both the second flanging edge and the first flanging edge are fixedly connected to the back plate.

10. The backlight module according to claim 1, wherein the first frame body and the second frame body are each made of cold-rolled carbon steel.

11. A display screen, comprising:
the backlight module according to claim 1; and
a display panel disposed above the first frame body.

12. The display screen according to claim 11, wherein a portion of each first side wall away from the back plate is exposed by the second frame body;
the display panel has a display region and a non-display region outside of the display region, wherein
the non-display region is disposed above end faces of the plurality of first side walls facing away from the back plate; and
a distance between a border of the non-display region and a border of the display region is greater than or equal to a thickness of a portion of each first side wall connected to the non-display region.

13. The display screen according to claim 12, wherein the distance between the border of the non-display region and the border of the display region is approximately 0.5 mm, and the thickness of the portion of the first side wall connected to the non-display region is approximately 0.4 mm.

14. The display screen according to claim 11, further comprising a first adhesive layer between the display panel and the first frame body.

15. The display screen according to claim 14, wherein the first adhesive layer is made of optical adhesive.

16. The display screen according to claim 11, wherein the backlight module further includes an optical film disposed above the second frame body; and
the display screen further comprises a second adhesive layer located between the optical film and a surface of the second frame body facing away from the back plate.

17. The display screen according to claim 16, wherein a portion of each first side wall away from the back plate is exposed by the second frame body;
the optical film has a plurality of side edges, and each side edge faces a portion of a corresponding first side wall exposed by the second frame body; and
the second adhesive layer is further located between at least one side edge of the optical film and a first side wall opposite to the at least one side edge.

18. The display screen according to claim 16, wherein the second adhesive layer is a transparent double-sided tape.

19. A tiled display device, comprising a plurality of display screens connected to each other, each according to claim 11.

* * * * *

UNITED STATES PATENT AND TRADEMARK OFFICE
CERTIFICATE OF CORRECTION

| | |
|---|---|
| PATENT NO. | : 11,360,351 B2 |
| APPLICATION NO. | : 17/209679 |
| DATED | : June 14, 2022 |
| INVENTOR(S) | : Xinrui Wang, Haijun Shi and Hao Wang |

It is certified that error appears in the above-identified patent and that said Letters Patent is hereby corrected as shown below:

On the Title Page

Item [30], should read "202010225310.9" instead of "02010225310.9".

Signed and Sealed this
Twenty-first Day of February, 2023

Katherine Kelly Vidal
*Director of the United States Patent and Trademark Office*